July 2, 1963  W. J. HOLLENBAUGH ETAL  3,095,737
FABRIC TESTER
Filed March 30, 1960  2 Sheets-Sheet 1
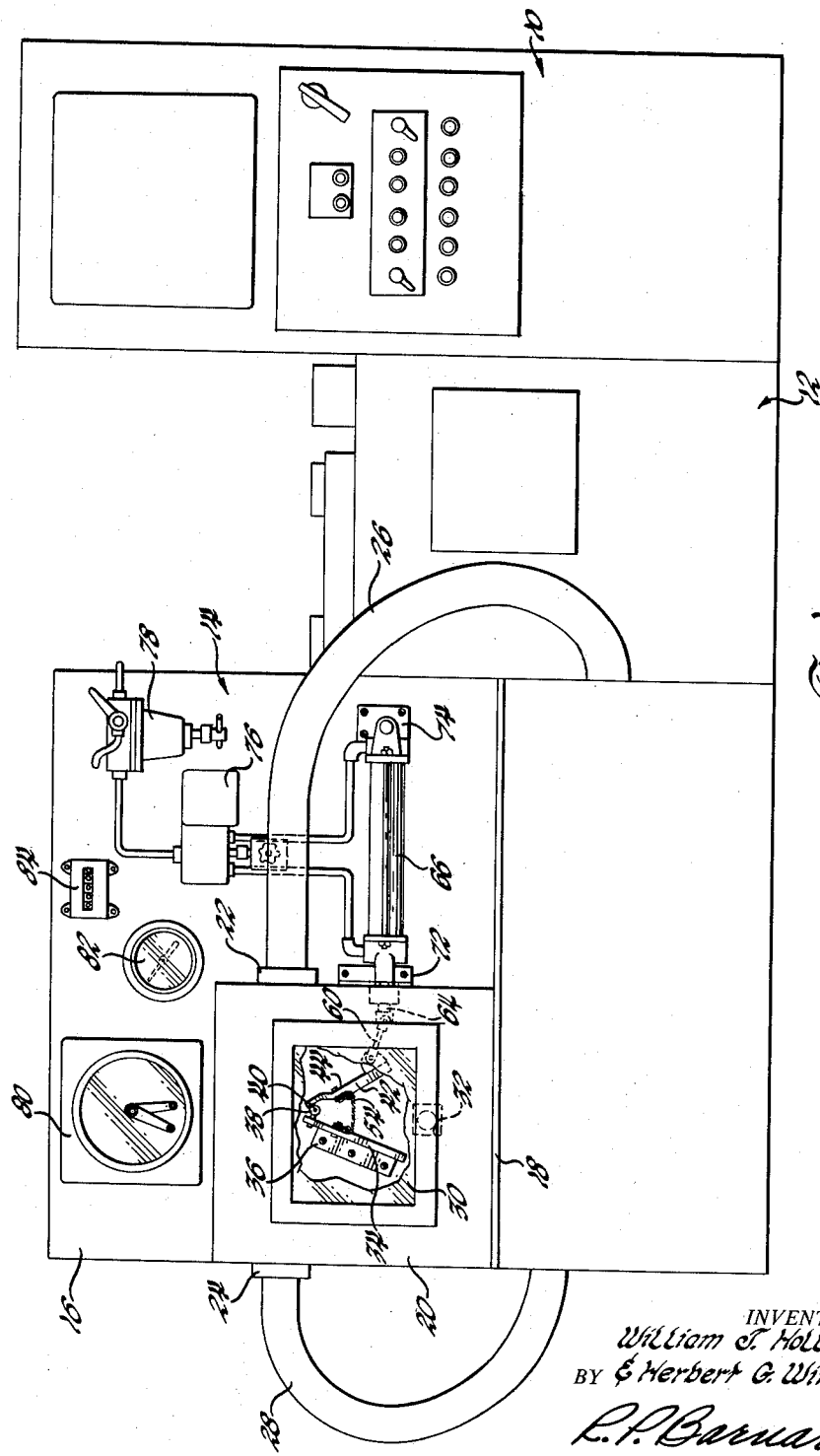
INVENTORS
William J. Hollenbaugh
BY & Herbert G. Winter
R. P. Barnard
ATTORNEY July 2, 1963  W. J. HOLLENBAUGH ETAL  3,095,737
FABRIC TESTER
Filed March 30, 1960  2 Sheets-Sheet 2
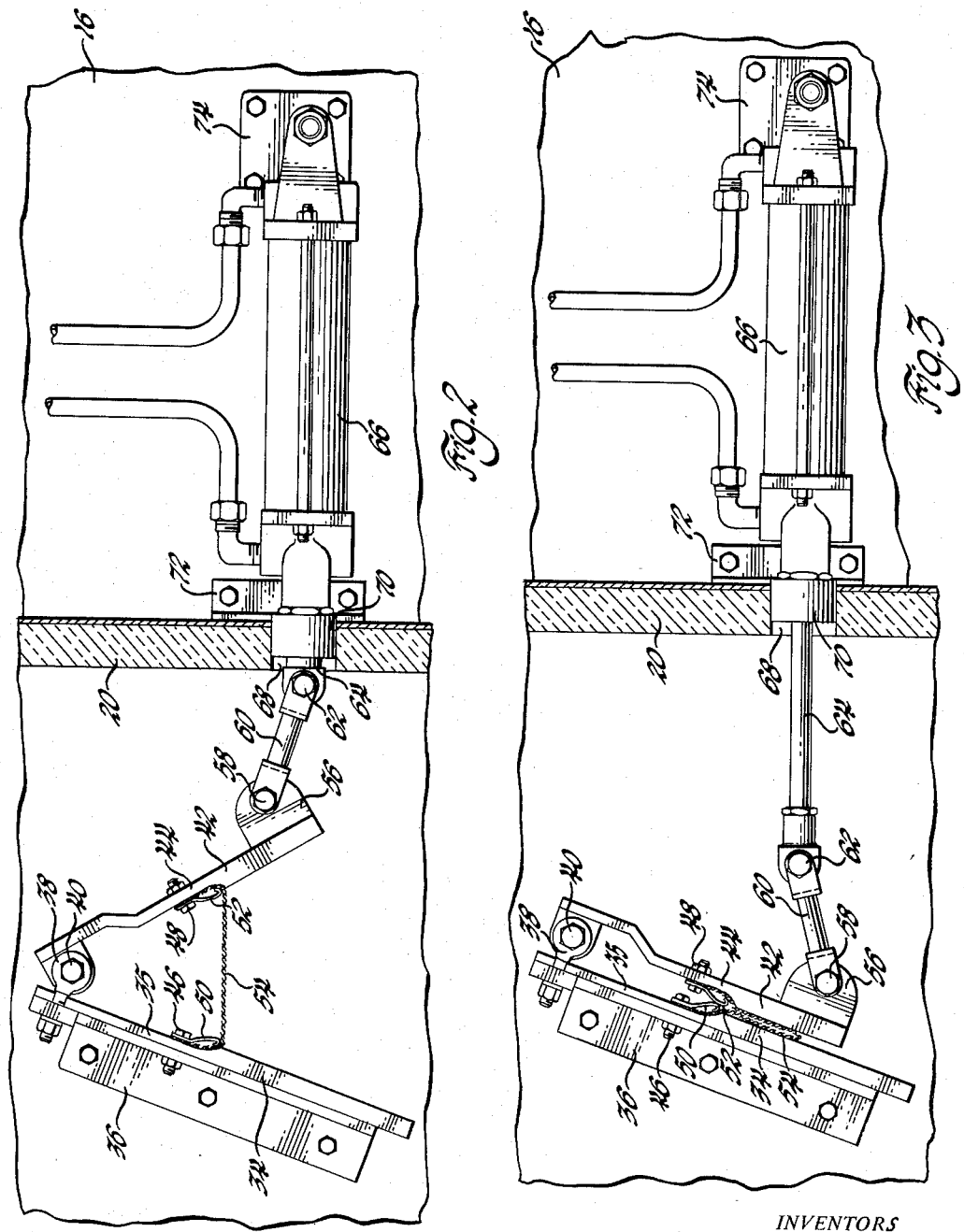
INVENTORS
William J. Hollenbaugh
BY & Herbert G. Winter
R. P. Barnard
ATTORNEY 3,095,737
FABRIC TESTER
William J. Hollenbaugh and Herbert G. Winter, Medina, Ohio, assignors to General Motors Corporation, Detroit, Mich., a corporation of Delaware
Filed Mar. 30, 1960, Ser. No. 18,617
6 Claims. (Cl. 73—159)

This invention relates to material testing apparatus and more particularly to a testing device for determining a material's crease resistance.

The advent of many new materials has created a need for apparatus to test impact and crease fatigue life of the materials under various conditions simulating working environments. We have determined that apparatus comprising a base platen and a flexing platen pivoted on the base platen and actuated by reciprocating means to produce a scissor type action produces the most favorable testing results. The material to be tested is suitably attached by clamps between the platens and the distance between the extreme open position thereof is such that the fabric will be stretched therebetween. When the platens are forced together, the material is creased and pressed in a manner that causes the crease to consistently occur in the same area of the material.

Accordingly, one of the objects of this invention is to provide a material testing device that alternately creases and stretches a test material. Another object of this invention is to provide a material testing apparatus which continually creases a test material in a particular area and, additionally, subjects the test material to pressure during the creasing operation. A further object of this invention is to provide means associated with the crease apparatus for automatically recording the number of cycles occurring before failure of the material tested. An additional object of this invention is to provide testing apparatus particularly adapted for simulating actual conditions occurring during normal use of the material and including alternate creasing and tensioning of the material.

Other objects and advantages of this invention will become apparent from the accompanying detailed specification wherein reference is made to the accompanying drawings in which:

FIGURE 1 is a side elevational view of the preferred embodiment of the invention;

FIGURE 2 is a detail view of the creasing mechanism illustrated in FIGURE 1 in an open position; and, FIGURE 3 is a detail view of the apparatus shown in FIGURE 2 in a closed position.

Referring now to the drawings, conventional air conditioning apparatus comprising a control unit 10 and a temperature conditioning chamber 12 are shown in association with the fabric testing apparatus 14 which is mounted on an upwardly extending support plate 16 and a support table 18. An insulated test chamber 20 is supported on the table 18 and is provided with an inlet port 22 and an outlet port 24 to permit air flow through the test chamber 20 from the conditioning chamber 12 via conduits 26, 28. An observation window 30 is provided and a suitable access door (not shown) permits entry to the interior of the test chamber. A light fixture 32 may be provided to illuminate the interior of the test chamber, wherein, testing mechanism is supported to provide for simulation of operating conditions to which a particular test material might be subjected in normal use.

The testing mechanism comprises a base platen 34 having a depending support flange 36 suitably secured to the back wall of the test chamber. A portion 35 of the base platen 34 is reduced in cross section and supports an adjustable trunnion means 38 at the end thereof. A pin member 40 is secured within the trunnion means 38 and pivotally supports a flexing platen 42 which is provided with a curved reduced portion 44 that corresponds to the curved reduced portion of the base platen 34. Fastening devices 46, 48 fixably support leaf spring members 50, 52 to the reduced portions of the base platen and the flexing platen as shown in FIGURES 2 and 3. The opposite ends of a test sample of sheet material, such as a piece of fabric 54, may be fastened to the reduced portions of the flexing and base platens by the fastening devices and resiliently biased thereagainst by the leaf spring members. The length of the test material is dimensioned so that when the flexing platen 42 is actuated to its open position, shown in FIGURE 2, the material is tensioned or stretched between the rounded free ends of the leaf spring members.

On the other end of the flexing platen 42, a flange 56 extends outwardly therefrom and supports a pin member 58. A link 60 is pivotally secured to the pin members 58 and to a pin member 62 on the end of a piston rod 64 which is driven by a servomotor such as a double-acting air cylinder 66. A port 68 in the wall of the test chamber 20 accommodates a sealing member 70 through which the piston rod is reciprocated. The servomotor is fastened to the support plate 16 by suitable brackets 72, 74. Conventional control valve means 76, 78 are provided for the double-acting air cylinder and a flexometer 80 of conventional construction is adapted to control the rate of actuation of the air cylinder which is suitably connected to a pressure source. A pressure gage 82 is mounted on the support plate 16 as illustrated in FIGURE 1. Since all of the actuating mechanism associated with the air cylinder is conventional, none of it is described in detail. An electric counter 84 is mounted on the support plate 16 and is provided with suitable counter actuating means to record each material flexing stroke.

It is to be noted that the base platen 34 and the flexing platen 42 are inclined to a vertical axis passing through the pivot pin 40 in the open position so that the test material more readily assumes the correct crease position as the platens are closed. By proper adjustment of the trunnion means 38 relative to the base platen, the pivotal mounting of the flexing platen and thus the spacing of the platen pressing surfaces may be varied in their closed material creasing positions to accommodate variations in the thickness of different sheet material samples and the creasing pressures to be applied thereto.

In operation, a piece of test material 54 is fastened between the flexing platen 34 and the base platen 42 by the fastening devices 46, 48 and the leaf spring members 50, 52 provided thereon. The reduced portions of the platens which accommodate the spring members allow the flexing plate to be closed to the crease position without interference. The length of the material as hereinbefore described is such that the material is in a tensioned condition when the flexing platen is in the open position. After the test material is in place, the test chamber 20 is suitably conditioned by the passage of air from the chamber 12 through the conduits 26, 28. The flexometer 80 is then set to cause a predetermined number of actuations of the air cylinder in a given period of time, and the air valve is connected to a high pressure source. Thus, the air cylinder 66 causes reciprocatory motion of the piston rod 64 and, consequently, reverse rotative movement of the flexing platen 42 about its pivotal connection 40 in a scissor-like movement. As the flexing platen is rotated downwardly toward the base platen 34, the test material 54 is moved downwardly and is pressed into a creased position between the flexing platen and the base platen at the end of the piston stroke of the air cylinder.

When the air cylinder reverses, the flexing platen is withdrawn from engagement with the base platen and the material being tested is returned to the tensioned position extending between the leaf spring members carried by the base and flexing platens. Spring cushioned tensioning of the test sample material thus occurs as the flexing platen reaches its opened position and provides controllable impact tensioning of the stretched material. During the downward movement of the flexing platen, the counter 84 is actuated to record the crease cycle. Each actuation of the flexing platen causes the test material to be creased in the same general area as the material is forced downwardly between the inclined platens. The alternate flexing and tensioning of the material tested very nearly approaches the conditions found in many uses where a material is subjected to the repeated application of forces which cause flexure of the material and subsequent returning to a tension position. Such environments are often found where material covers a spring member that is subject to repeated forces so that, as the spring is compressed, the material is creased and, as the spring rebounds, the material is subject to a tensioning force.

Although only the preferred embodiment has been described for purposes of illustration, it is comprehended that various changes and modifications are possible within the scope of this invention as defined by the appended claims.

We claim:

1. Sheet material testing apparatus comprising a base platen having a portion recessed from a test material pressing surface thereon, a material flexing platen having a portion recessed from a test material pressing surface thereon, means for pivotally mounting said flexing platen for swinging movement relative to said base platen about a pivotal axis spaced from said recessed platen portions between a test material stretching opened position wherein said flexing platen is spaced from and angularly inclined to said base platen and a test material creasing closed position wherein folding engagement occurs between the test material and the pressing surfaces of said platens, power means operable to actuate said flexing platen between its opened and closed positions, fastening means for securing opposite ends of a test sample of sheet material within the recessed portions of said platens, and platen carried spring means for resiliently biasing the fastened end portions of the test sample sheet material against said recessed platen portions at a point adjacent the pressing surfaces thereof whereby said test sample sheet material is alternately stretched between said platen carried spring means and creased between said pressing surfaces upon actuation of said platens between their opened and closed positions.

2. In a sheet material testing apparatus as set forth in claim 1, said pivotal mounting means being adjustable relative to at least one of said platens to vary the spacing of said axis with respect to the pressing surface of said one platen to permit substantially parallel spacing of said pressing surfaces in their closed material creasing position thereby accommodating thickness variations in different sheet material samples.

3. A sheet material testing apparatus as set forth in claim 1 further comprising means defining a test chamber spacedly embracing said platens, means for conditioning said test chamber to simulate various working environments for different test materials, said power means being outside said test chamber, and means operably connecting said power means and said flexing platen, said connecting means extending into said test chamber defining means in sealed relation thereto.

4. Sheet material testing apparatus comprising a base platen and a material flexing platen pivotally mounted at one end for swinging movement relative to said base platen, said platens having opposed recessed portions adjacent the pivotally mounted end of the flexing platen and having opposed test material pressing surfaces thereon distal from said pivotally mounted end, power means for actuating said flexing platen between a test material stretching opened position spaced from and angularly inclined to said base platen and a test material creasing closed position wherein folding engagement occurs between the test material and the pressing surfaces of said platens, means for securing opposite ends of a test sample of sheet material within the recessed portions of said platens, and leaf spring means normally biasing the secured end portions of the test sample sheet material within said recessed platen portions to a point adjacent the pressing surfaces thereof whereby said test sample sheet material is alternately stretched between said spring means and creased between said pressing surfaces upon actuation of said platens between their opened and closed positions.

5. In a sheet material testing apparatus as set forth in claim 4, means for adjusting the pivotal mounting of said flexing platen to vary the spacing of said platen pressing surfaces in their closed material creasing position to thereby accommodate the variations in the thickness of different sheet material samples.

6. A sheet material testing apparatus as set forth in claim 5 further comprising means defining a test chamber spacedly embracing said platens, means for conditioning said test chamber to simulate various working environments for different test materials and means for sealing said power means and its actuating connection with said flexing platen relative to said test chamber defining means.

References Cited in the file of this patent

UNITED STATES PATENTS

| | | |
|---|---|---|
| 2,179,116 | Clark | Nov. 7, 1939 |
| 2,701,962 | Stoll | Feb. 15, 1955 |
| 2,766,624 | Hefner | Oct. 16, 1956 |

OTHER REFERENCES

"Textile Testing in Germany" by Schiefer et al., Textile Research Journal, February, 1948 (pages 89–93). (A copy is available in Div. 36, 73–100.)